Figure 1:
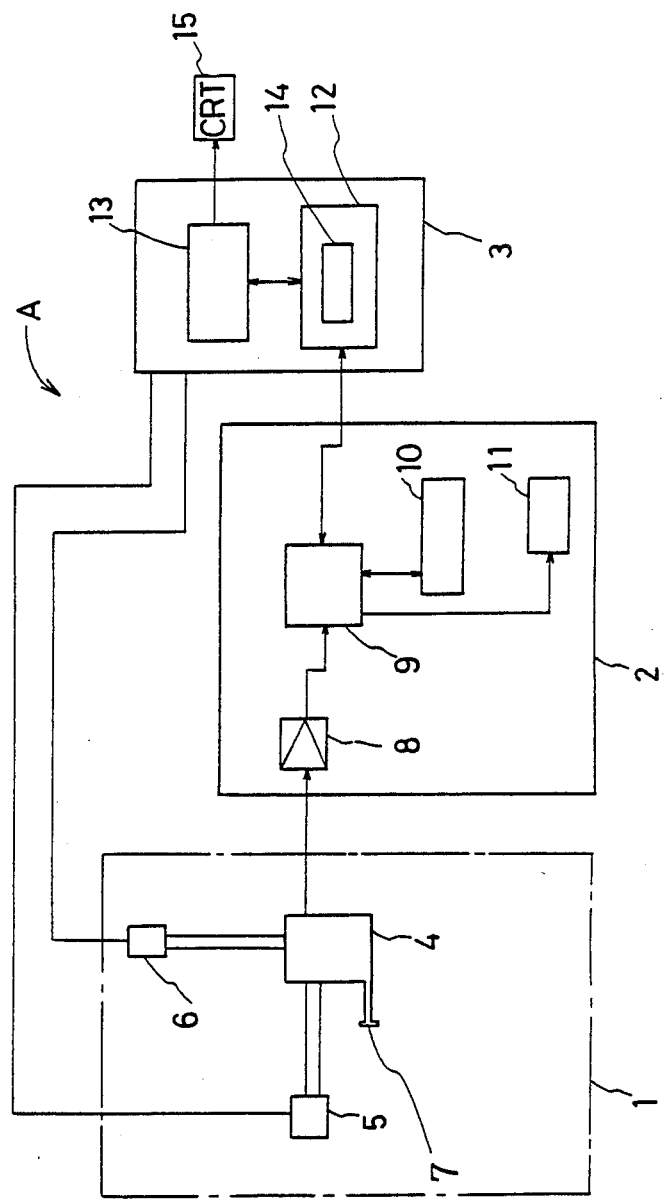

United States Patent [19]

Sugimura

[11] Patent Number: 4,761,891
[45] Date of Patent: Aug. 9, 1988

[54] METHOD AND APPARTUS FOR MACHINING A SCREW THREAD WITH LITTLE DISPERSION

[76] Inventor: Nobuyuki Sugimura, 308, Mabase, Shimizu-shi, Shizuoka-ken, Japan

[21] Appl. No.: 120,736

[22] Filed: Nov. 10, 1987

Related U.S. Application Data

[63] Continuation of Ser. No. 758,134, Jul. 23, 1985, abandoned.

[30] Foreign Application Priority Data

Jul. 26, 1984 [JP]  Japan ............... 59-113787[U]

[51] Int. Cl.$^4$ ............................................ B43L 7/06
[52] U.S. Cl. ........................................ 33/503; 33/504; 33/505; 33/199 B; 33/532; 82/2 B; 82/5; 82/14 D
[58] Field of Search ................. 82/2 B, 5, 14 D; 408/13; 33/199 R, 199 B, 504, 556, 557, 558, 559, 560, 561, 505, 532

[56] References Cited

U.S. PATENT DOCUMENTS

| | | | |
|---|---|---|---|
| 3,554,651 | 1/1971 | Ware | 33/199 B |
| 3,623,216 | 11/1971 | Aihara et al. | 29/568 |
| 3,740,160 | 6/1973 | Kimura et al. | 408/13 |
| 3,796,493 | 3/1974 | Yamamoto et al. | 33/199 B |
| 3,827,154 | 8/1974 | Kaifesh | 33/199 R |
| 3,840,994 | 10/1974 | Izumi et al. | 33/504 |
| 4,079,235 | 3/1978 | Froyd et al. | 82/2 B |
| 4,275,507 | 6/1981 | von Haas | 33/199 R |
| 4,352,246 | 10/1982 | Hauert | 33/559 |
| 4,384,332 | 5/1983 | McMurtry | 364/474 |
| 4,451,892 | 5/1984 | McMurtry | 82/2 B |
| 4,580,348 | 4/1986 | Boynton et al. | 33/199 R |
| 4,583,159 | 4/1986 | Kanemoto et al. | 364/474 |

Primary Examiner—Frederick R. Schmidt
Assistant Examiner—Lawrence Cruz
Attorney, Agent, or Firm—Wood, Dalton, Phillips, Mason & Rowe

[57] ABSTRACT

In an NC-lathe comprising a thread touch sensor provided with a touch portion to be brought into contact with an effective radius/diameter portion of a screw thread, an automatic measuring device electrically connected to the thread touch sensor, and an automatic correction device connected to the automatic measuring device; an effective radius or diameter of a screw thread is measured by bringing the touch portion of the thread touch sensor into contact with an effective radius/diameter portion of the screw thread, the measured dimension is compared with a desired dimension, and when a difference is produced between the respective dimensions, the NC-lathe is controlled by correcting an amount of machining by means of the automatic correction device.

10 Claims, 14 Drawing Sheets

FIG. 39 FIG. 40 FIG. 41
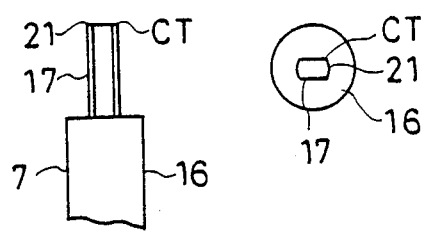
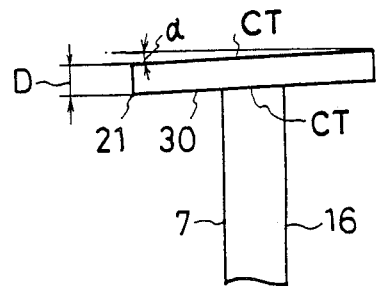
FIG. 42 FIG. 43
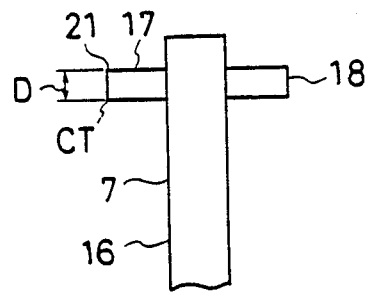
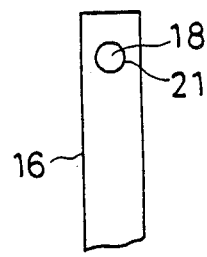
FIG. 44 FIG. 45
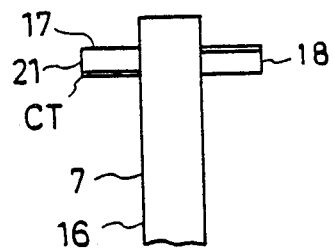
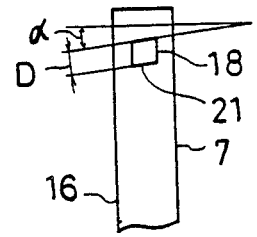

METHOD AND APPARTUS FOR MACHINING A SCREW THREAD WITH LITTLE DISPERSION

This application is a continuation of application Ser. No. 758,134, filed July 23, 1985, now abandoned.

The present invention relates to a method and an apparatus for machining a screw thread with little dispersion, and more particularly to such method and apparatus in which a screw thread is machined by means of a numerically controlled machining tool, an effective radius or diameter of the screw thread is automatically measured during the machining, and automatic correction is effected when a difference is produced between the measured value and a desired dimension.

In a numerically controlled machining tool, a tool path for machining, a rotational speed of a work and the like are input from cards, perforated tapes. magnetic tapes, etc. to a numerical control device in the form of coded numerical values, and machining is carried out according to output instructions from the numerical control device. While the numerically controlled machining tool, especially an NC-lath, is employed for threading in view of its performance, the so-called dispersion phenomena in which an effective radius or diameter of a finished screw thread is different from a desired dimension would arise due to thermal displacement of a machine, wear of a tool and the like.

Therefore, it may be conceived that an NC-lathe is subjected to automatic correction by mounting an automatic measuring device for measuring an effective radius or diameter of a screw thread and an automatic correction device for correcting a numerical control device according to the results of measurement, to the NC-lathe. However, such automatic measurement of an effective diameter of a screw thread was impossible in the prior art, and accordingly, automatic correction of an NC-lathe by means of an automatic correction device could not be achieved in the prior art.

Heretofore, measurement of a screw thread was performed through a method of measuring a screw thread one by one as compared with a thread gauge, that is, a method of measuring it by means of a go/notgo gauge without measuring numerically.

Therefore, in the case of correcting a machining amount of a screw thread, an amount of correction was determined by an experience or a hunch of a worker on the basis of an extent of loosenes upon passing through a go gauge, and an NC-lathe is controlled by inputting the amount of correction to a numerical control device.

In the prior art, since the amount of correction is determined by an experience or a hunch of a worker, a lot of dispersion was present in a dimension of a finished screw thread, and so, it was impossible to machine a highly precise screw thread.

In view of the above-mentioned disadvantage in the prior art, the present invention has it as an object to provide a method and an apparatus for machining a screw thread with little dispersion.

According to the present invention, an NC-lathe having a thread touch sensor provided with a touch portion to be brought into contact with an effective radius or diameter portion of a screw thread, an automatic measuring device electrically connected with the thread touch sensor and an automatic correction device connected with the automatic measuring device, is employed, in which an effective diameter of a screw thread is measured by bringing the touch portion of the thread touch sensor with the effective radius or diameter portion of the screw thread, the measured dimension and a desired dimension are compared with each other, and when a difference is produced therebetween, an amount of machining is corrected by the automatic correction device and thus the NC-lathe can be controlled.

A work is fixed to a chuck of an NC-lathe to machine a screw thread, and during that machining an effective radius or an effective diameter of the screw thread is measured by means of an automatic measuring device having a thread touch sensor. In this measuring process, a number of points on the screw thread are measured by the thread touch sensor, then the configmation of the screw threads is analyzed by a computer on the basis of the measured data, thus a position of a screw groove, that is, an X-coordinate of a center of a screw groove is sought for, and after the thread touch sensor has been moved up to the position of this X-coordinate, it is further moved in the direction of the Y-axis to bring a touch portion of the thread touch sensor into contact with the both surfaces of the screw groove. The effective radius of the screw thread is calculated on the basis of the Y-coordinate value at that moment. Furthermore, after the effective radius has been measured, the screw thread is measured with the thread touch sensor moved in the axial direction of the screw thread by a distance of [an angle in the direction of a lead angle about the axis of the screw threads]$\times$[pitch/360° ], and thereby an effective diameter of the screw thread is calculated.

When the thus obtained effective radius or effective diameter is different from a desired dimension, the automatic correction device operates to control the numerical control device, and thereby the amount of machining the screw threads is automatically corrected.

Figure 2:
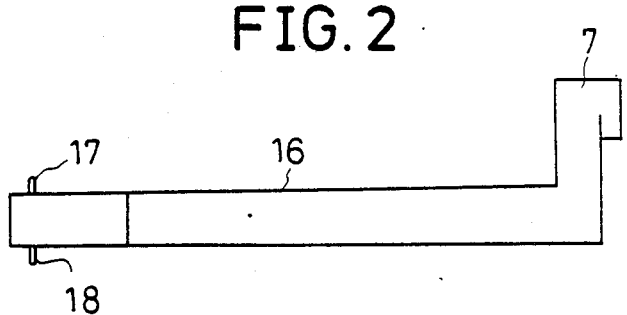
Figure 7:
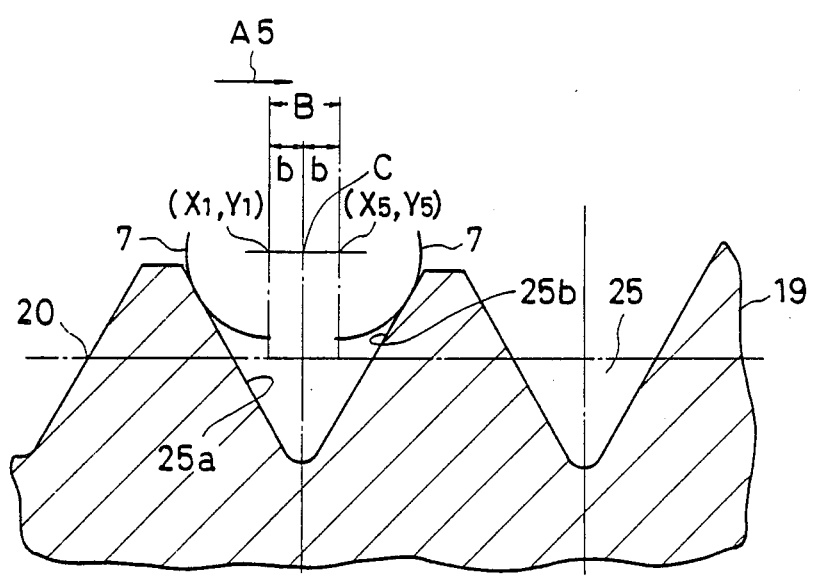
Figure 8:
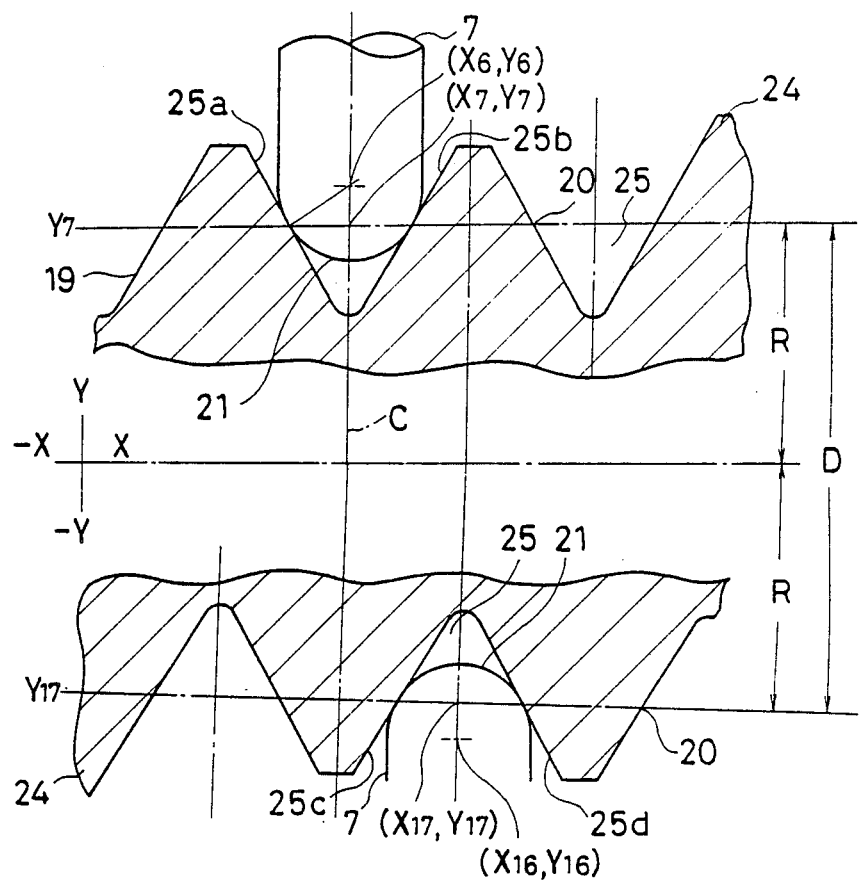
Figure 9:
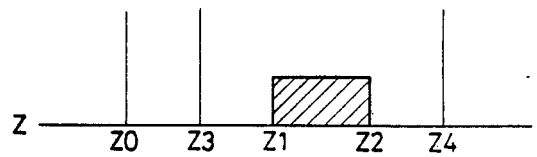
Figure 54:
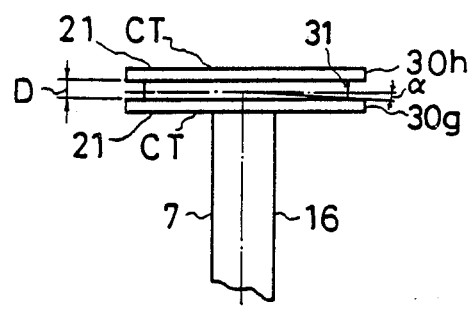
Figure 55:
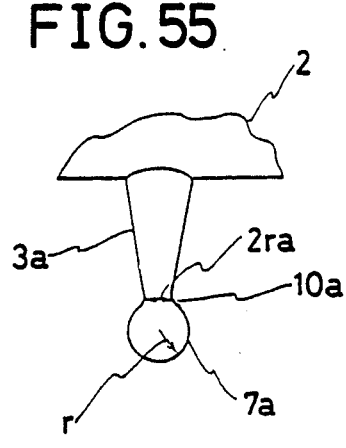
Figure 56:
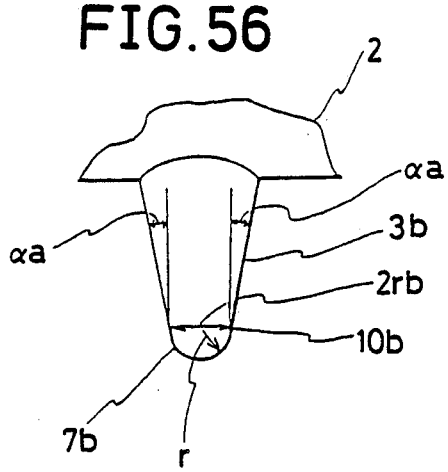

In the accompanying drawings:

FIG. 1 is a flow chart of an NC-lathe according to one preferred embodiment of the present invention, FIGS. 2 through 56 jointly show a number of preferred embodiments of the present invention, FIG. 2 is a schematic plan view showing a thread touch sensor, FIGS. 3 to 8 and 10 are schematic views showing the states where the thread touch sensor in FIG. 2 is being used, FIG. 9 is a diagram showing the relations between a reference value, a desired dimension and upper and lower limit values, FIGS. 11 to 25 are schematic views showing various embodiments of a touch sensor whose touch portion is spherical, FIGS. 26 to 37 are schematic views showing various embodiments of a touch sensor whose touch portion has a frustum shape, FIGS. 38 to 54 are schematic views showing various embodiments of a touch sensor having a touch portion which comes into contact with an effective diameter portion of a screw thread at an edge of the touch portion, and FIGS. 55 and 56 are schematic views showing other embodiments of a touch sensor whose touch portion is spherical.

In the following, preferred embodiments of the present invention will be described with reference to the accompanying drawings. In FIG. 1, reference character A designates a numerically controlled machine tool (hereinafter called simply "NC-lathe"), which consists of a lathe main body 1, an automatic measuring device 2, and a numerical control device 3. On the lathe main body 1 are provided servo motors 5 and 6 for moving a tool rest 4 and a thread touch sensor 7 mounted to the tool rest 4.

The automatic measuring device 2 is provided with a central processing unit 9 to be connected to the thread touch sensor 7 via an amplifier 8, an input section 10 for reference parameters that is connected to the central processing unit 9, and a print-out section 11 for measured data and the like.

In the numerical control device 3 is provided a numerical controller section (NC section) 13 to be connected to the central processing unit 9 via a programable controller (PC) 12, and in this PC 12 is provided an automatic correction device 14. The NC section 13 is connected to a cathode ray tube (CRT) 15, and is also electrically connected to the servo motors 5 and 6.

The automatic measuring device 2 and the automatic correction device 14 are commercially available from such companies as Mazak Corporation, 8025 Production Drive, Florence, Ky. 41042.

Figure 3:
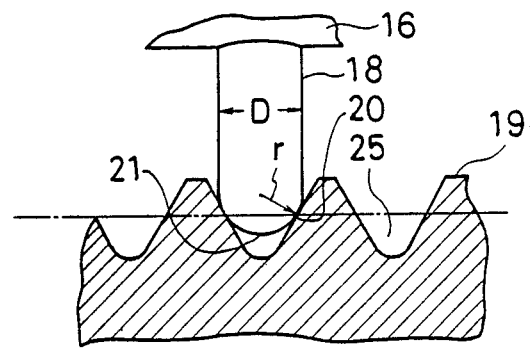

FIGS. 2 and 3 illustrate a thread touch sensor 7, which is composed of cylindrical pins 17 and 18 provided on a rod-shaped body 16 as directed in the opposite directions at right angles to the longitudinal direction of the rod-shaped body 16, and touch portions 21 provided at the tip ends of the pins 17 and 18. The touch portion 21 is formed of a spherical surface having a radius r which comes into contact with an effective diameter portion 20 of a screw thread 19 at two points.

In the case of a JIS 60° thread, the relation of a diameter D of the pins 17 and 18 and the radius r of the touch portion 21,to a pitch P of the thread is, for instance, as follows:

| Pitch P | Radius r (mm) | Diameter D (mm) |
|---------|---------------|-----------------|
| 0.2     | 0.1155/2      | 0.1155          |
| 0.25    | 0.1443/2      | 0.1443          |
| 0.5     | 0.2887/2      | 0.2887          |
| 1.0     | 0.5774/2      | 0.5774          |
| 1.5     | 0.8949/2      | 0.8949          |
| 1.75    | 1.0227/2      | 1.0227          |
| 2.0     | 1.1547/2      | 1.1547          |
| 2.5     | 1.4434/2      | 1.4434          |
| 3.0     | 1.7897/2      | 1.7897          |

Now description will be made on a method for measuring an effective radius and an effective diameter of a screw thread.

Figure 4:
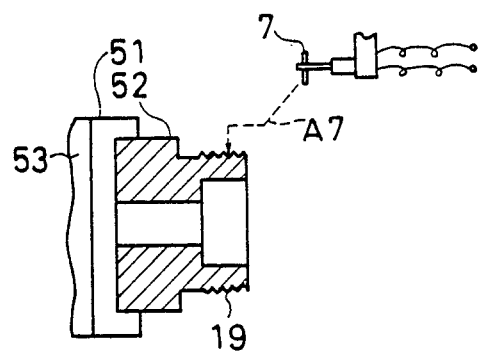
Figure 5:
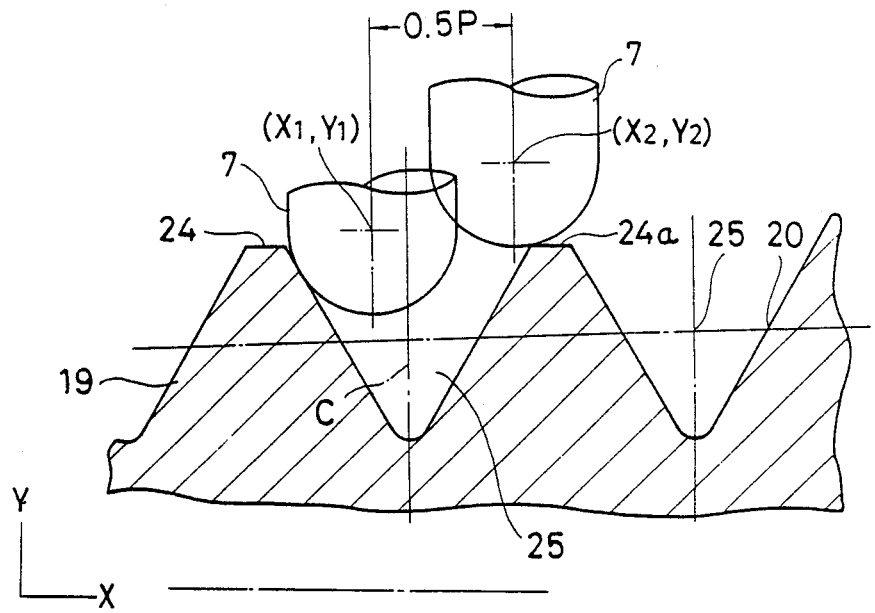

After setting of a reference value $Z_0$, desired dimensions $Z_1$-$Z_2$, upper and lower limit values $Z_3$ and $Z_4$ as shown in FIG. 9 as well as zero adjustment of the thread touch sensor have been carried out in the automatic measuring device 2 of the NC-lathe A, a work 52 is mounted to a chuck 51 of the lathe main body 1 and then threading is performed as shown in FIG. 4. During the threading, after the work 52 has been fixed by stopping rotation of a main shaft 53, the thread touch sensor 7 on the tool rest 4 is moved to a predetermined position by means of an indexing mechanism (not shown) for the tool rest, then it is further moved along an arrowed dash line A7 (See FIG. 4) to bring the touch portion 21 of the thread touch sensor 7 into contact with an arbitrary point on the screw thread 19 as shown in FIG. 5, and coordinate values ($X_1$, $Y_1$) of the thread touch sensor 7 at the moment of touching are read out. Subsequently, after the thread touch sensor 7 has been moved by 0.5 pitches in the direction of the X-axis while moving it upwards so as not to touch with the adjacent thread ridge 24a, it is moved in the direction of the (−Y)- −axis. Then the touch portion 21 of the thread touch sensor 7 will touch with the next thread ridge 24a, and coordinate values ($X_2$, $Y_2$) of the thread touch sensor 7 at that moment are read out.

A position of a thread groove 25 is determined on the basis of the thus obtained coordinate values ($X_1$, $Y_1$) and ($X_2$, $Y_2$).

More particularly, the position of the thread touch sensor 7 having a smaller Y-coordinate value is located within the thread groove 25, and if the Y-coordinate values $Y_1$ and $Y_2$ of the respective positions should be equal to each other, the points of the X-coordinate values $X_1$ and $X_2$ are both located within the thread groove 25. In the case illustrated in FIG. 5, since the coordinate value $Y_1$ is smaller than the coordinate value $Y_2$ the position of the coordinate values ($X_1$, $Y_1$) is located within the thread groove 25.

Figure 6:
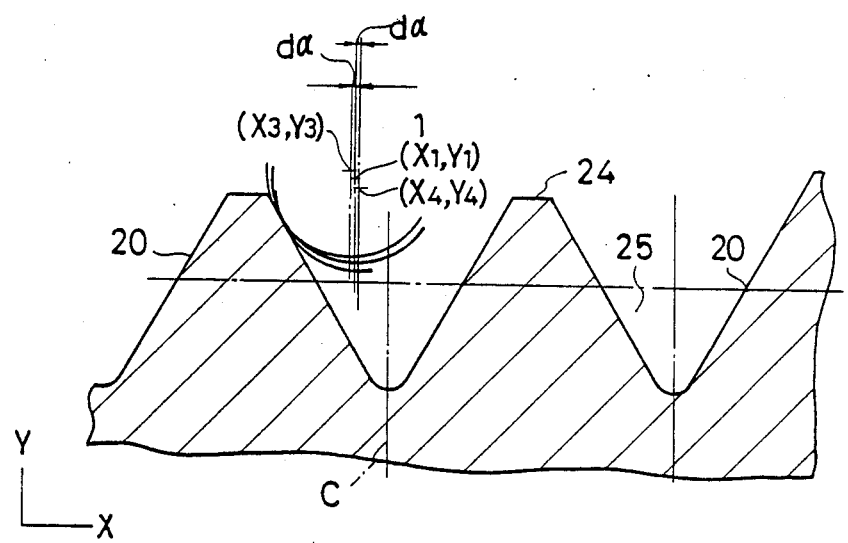

Subsequently, as shown in FIG. 6, the point of the coordinate values ($X_1$, $Y_1$) within the screw groove 25 is chosen as a base point 1, then the thread touch sensor 7 is moved from this base point 1 in the (−X)−axis direction and in the (+X)−axis direction by the same dimension do in absolute values (in the illustrated case, it is moved in the (−X)−axis direction after it has been moved in the Y-axis direction by a certain distance in order to avoid hindrance by the left side thread ridge), thereafter the thread touch sensor 7 is moved in the (−Y)−axis direction until it touches the thread ridge 24, and the Y-coordinate values $Y_3$ and $Y_4$ at the respective positions are read out. Comparing the Y-coordinate values $Y_3$ and $Y_4$ with the Y-coordinate $Y_1$ of the base point 1, the direction of movement of the point having a smaller Y-coordinate is the direction towards a center line C of the thread groove 25. If the Y-coordinate values $Y_3$ and $Y_4$ are equal to each other, the base point 1 ($X_1$, $Y_1$) is located on the center line C of the thread groove 25. In the case where the Y-coordinate values $Y_3$ and $Y_4$ are not equal to each other, the thread touch sensor 7 is moved from the base point 1 ($X_1$, $Y_1$) towards the center line C of the thread groove 25 (in the direction of arrow A5) until it touches a thread groove surface 25b, as shown in FIG. 7. Representing the X-coordinate value at this moment by $X_5$, a point separated from the base point 1 by a distance b that is one-half of the difference (that is, distance) B between the coordinate values $X_1$ and $X_5$, is located on the center line C of the thread groove 25. After the thread touch sensor 7 has been moved to a position on the thus obtained center line C of the thread groove 25, that is, to a position having an X-coordinate value $X_6$ as shown in FIG. 8, it is further moved in the (−Y)−axis direction. Then the touch portion 21 touches effective diameter portions 20 of the both surface 25a and 25b of the thread groove 25, and coordinate values ($X_6$, $Y_6$) at this moment are read out. Coordinate values ($X_7$, $Y_7$) of the effective diameter portion 20 are calculated on the basis of this Y-coordinate value $Y_6$ and preset measurement parameters such as roundness of the touch portion of the thread touch sensor 7, a lead angle of the thread, etc. The calculated Y-coordinate value $Y_7$ is the sought effective radius R. This method of measurement is especially effective when the opposite ends of the work 52 are fixed and hence measurement can be done from one side only.

After the effective radius R has been calculated in the above-described manner, the angular position of the thread touch sensor 7 is shifted by 180° while separating it from the work 52, and thus a measurement angle is set at 180°. In more particular, the thread touch sensor 7 is displaced along the X-axis in the direction of a lead angle by 180°×[Pitch/360°], and is brought into contact with the both surfaces 25c and 25d of the thread groove 25 by moving it in the (+Y)−axis direction. Then the touch portion 21 would touch the effective diameter portions 20 of the both surfaces 25c and 25d of the thread groove 25. The position ($X_{16}$, $Y_{16}$) of the touch portions 21 at this moment is the measurement point for an effective diameter D. The Y-coordinate values $Y_7$ and $Y_{17}$ of the effective diameter portion 20 are calculated on the basis of the thus obtained Y-coordinate values $Y_6$ and $Y_{16}$ and the preset measurement parameters as described above. The sum of the absolute values of the both Y-coordinate values $Y_7$ and $Y_{17}$ is the sought effective diameter D.

The effective radius R and the effective diameter D obtained in the above-described manner are compared with the desired dimensions which have been already input to the automatic measuring device, and in the event that a difference exists therebetween, the programable controller 12 in the numerical control device 3 is actuated by an output of the central processing unit 9 to drive the automatic correction device 14. This automatic correction device 14 controls the servo motors 5 and 6 via the NC section 13, for instance, so as to displace the tool rest 4 with respect to the axis of the NC-lathe by the amount of correction, and thereby the relative positioning between the work 52 and a cutter 30 (not shown) is made to be appropriate.

FIG. 9 shows the relations among a reference dimension $Z_0$, desired dimensions $Z_1$-$Z_2$, an upper limit value $Z_3$ and a lower limit value $Z_4$. In the event that the measured values of the effective radius R and the effective diameter D obtained in the abovedescribed manner are greatly different from the desired dimensions $Z_1$-$Z_2$ and exceed the upper limit value $Z_3$ or the lower limit value $Z_4$, if the operation of the NC-lathe is stopped and automatic exchange of tools is performed, then continuous threading becomes possible.

According to the present invention, besides the above-described embodiment, measurement for asymmetric threads, internal diameter threads and tapered threads is also possible. In the following, description will be made on measurement of various kinds of tapered threads.

When threading is carried out by means of an NC-lathe which has the same capability as that described in the preceding embodiment and which is also associated with an automatic indexing device, there exists such mechanism that a starting position of a threading cutter rest is always correlated with a rotational position of a main shaft, that is, such mechanism that a rotational position of the main shaft on which a work is mounted and which is subjected to a rotational motion is detected so that threading may be started from a predetermined rotational position of the main shaft. In other words, the ridges and grooves of the thread are always located at the positions separated from a predetermined position of a chuck by the same dimensions, respectively. Hence, if the main shaft is stopped at a predetermined rotation position by means of the indexing device for the main shaft, the positions of the respective ridges and grooves in a given plane including the axis of the main shaft are not varied.

Figure 10:
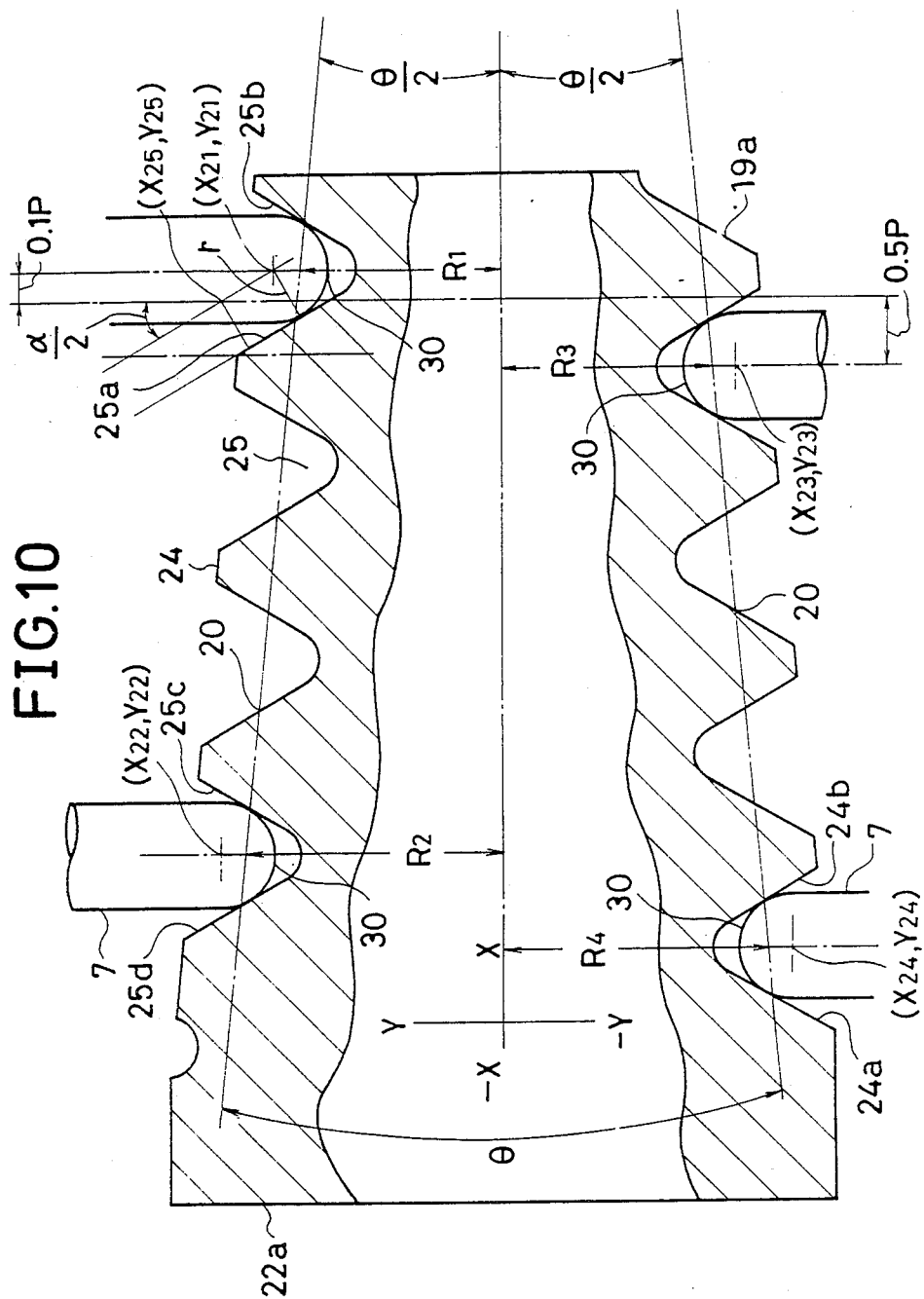

By making use of the above-described characteristics of machining by means of the NC-lathe, automatic measurement and automatic correction for a screw thread can be done. Explaining now the operation of this embodiment, setting of a reference value, desired dimensions and upper and lower limit values in the automatic measuring device of the NC-lathe as well as zero adjustment of the thread touch sensor are carried out, subsequently threading is effected with the work mounted to the chuck of the NC-lathe, the main shaft is stopped at a predetermined rotational position by making use of the automatic indexing mechanism, the touch sensor mounted to the tool rest is moved to a predetermined position by means of an NC tool rest indexing mechanism, and as shown in FIG. 10, at the axial position having an X-coordinate $X_{21}$ the touch sensor is moved in the (−Y)−axis direction until a touch portion 30 is brought into contact with the both surfaces 25a and 25b of the thread groove 25. After the coordinate values ($X_{21}$, $Y_{21}$) at this moment have been read out, the thread touch sensor 7 is moved in the (+Y)−axis direction so as not to touch with the thread ridges 24, then it is moved in the (−X)−axis direction, and after it has been stopped at the position of the X-coordinate value $X_{22}$ which is shifted by 3 pitches from the position of $X_{21}$, it is further moved in the (−Y)−axis direction until the touch portion 30 touches the both surfaces 25c and 25d of the thread groove 25. The coordinate values ($X_{22}$, $Y_{22}$) at this moment are read out. Then calculation is performed on the basis of these coordinate values ($X_{21}$, $Y_{21}$) and ($X_{22}$, $Y_{22}$) and the measurement parameters which were preliminarily input to the automatic measuring device 2, and thereby one-half of a taper angle $\theta$, that is $\theta 2$ can be obtained. In addition, the effective radii $R_1$ and $R_2$ at the points having the coordinate values ($X_{21}$, $Y_{21}$) and ($X_{22}$, $Y_{22}$) can be calculated from the coordinate values $Y_{21}$ and $Y_{22}$, respectively, through the procedure described previously. Furthermore, when the thread touch sensor 7 has been displaced by 180° about the axis of the work 22a while it is separated from the work 22a so as not to touch the work 22a, the X-coordinate value $X_{23}$ of the touch sensor 7 is located at a point displaced by 0.5 pitches from the point of the X-coordinate value $X_{21}$ along the X-axis, owing to the automatic indexing mechanism. Here, the thread touch sensor 7 is moved in a similar manner to that described above, then the coordinate values $X_{23}$, $Y_{23}$) and ($X_{24}$, $Y_{24}$) at the moment when the touch portion 30 has touched the effective diameter portions 20 are read out, and on the basis of these coordinate values, one-half of the taper angle $\theta$, that is, $\theta/2$ and the effective radii $R_3$ and $R_4$ at the points of the X-coordinates $X_{23}$ and $X_{24}$, respectively, are calculated.

In addition, if the coordinate values ($X_{25}$, $Y_{25}$) at the position of the thread touch sensor 7 that has been displaced from the position ($X_{21}$, $Y_{21}$) in the (−X)−axis direction by a certain small distance such as, for example, 0.1 pitches are read out, then one-half of the thread angle $\theta$ can be calculated. When a difference is produced between the effective radii $R_1$-$R_4$, the taper angle $\theta$ or the angle $\theta/2$ calculated as described above and the desired dimensions at the corresponding measurement points, automatic correction is carried out in the above-described manner. This touch sensor is also available for measurement of an object other than a screw thread.

The structure of the touch sensor 7 is not limited to the above-described embodiment, but, for instance, structures illustrated in FIGS. 11 to 54 could be employed therefor.

At first, description will be made on thread touch sensors in which a touch portion 21 coming into contact with an effective diameter portion of a screw thread has a spherical surface as is the case with the above-described embodiment (pattern 1) with reference to FIGS. 11 to 25. In these figures, reference character $\alpha$ designates a radius of the spherical surface, reference character designates a lead angle of the screw thread, reference character P designates a pitch, and reference characters CT designate the position of the touch portion coming into contact with the effective diameter portions of the both surface of the thread groove.

Figure 11:
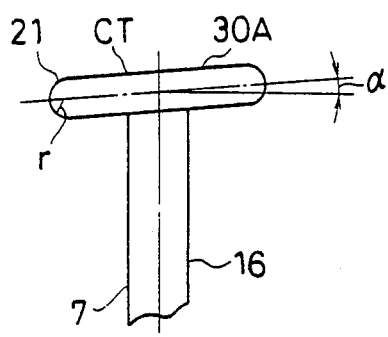
Figure 12:
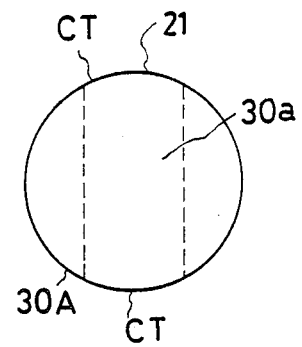
Figure 13:
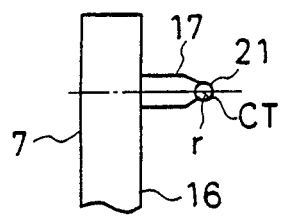
Figure 14:
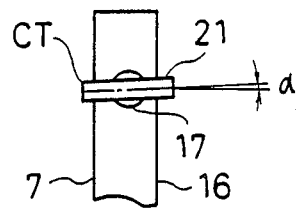
Figure 15:
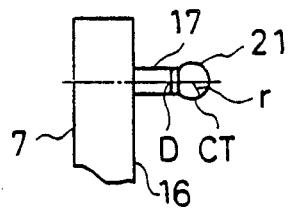
Figure 16:
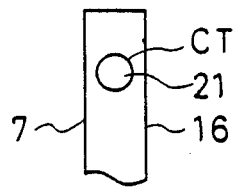

A touch sensor 7 shown in FIGS. 11 and 12 consists of a circular plate 30A provided at the tip end of a rod body 16 with an inclination of a lead angle $\alpha$, and the edge portion of the circular plate 30A is formed in a spherical shape having a radius ] at its touch portion 21. In this touch sensor 7, all the edge portion can serve as the touch portion 21, and so, it is convenient in use. However, the opposite side portions thereby could be cut away along dash lines in FIG. 12 to use the residual portion 30a as the touch portion 21.

In a touch sensor 7 shown in FIGS. 13 to 17, a single pin 17 is formed laterally with respect to the longitudinal direction of the rod body 16, and a touch portion 21 is provided at the tip end of the pin 17. In the embodiment shown in FIGS. 13 and 14, the touch portion 21 has a cylindrical shape, and it is inclined by a lead angle $\alpha$ with respect to the plane perpendicular to the rod body 16. In the embodiment shown in FIGS. 15 and 16, a spherical body having a diameter 2r that is larger than a diameter D of the pin 17 forms the touch portion 21.

Figure 17:
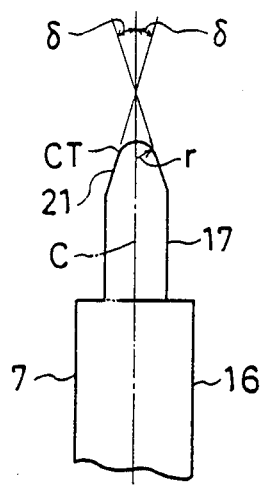

In a touch sensor 7 shown in FIG. 17, a pin 17 is provided on an end surface of the longitudinal direction of the rod body 16 at right angles to the end surface, and a touch portion 21 is formed at the tip end of the pin 17, and the touch portion 21 consists of a frustoconical body whose tip angle $2\delta$ (that is, twice the angle $\delta$ formed between a generating line of the frustoconical body and the center axis of the pin 17) is smaller than the thread groove angle, and which has a hemispherical portion of radius r at its tip end.

Figure 18:
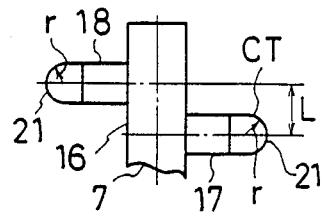
Figure 19:
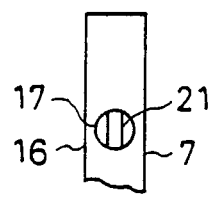

Each of touch sensors 7 shown in FIGS. 18 to 24 has a plurality of touch portions. In FIGS. 18 and 19, pins 17 and 18 are provided laterally with respect to the longitudinal direction of the rod body 16 as displaced relative to each other in the direction of the lead angle of the thread by a distance L=[a measurement angle in the direction of the lead angle about the axis of the screw thread]$\times$[pitch/360°], and touch portions 21 are provided at the tip ends of the respective pins 17 and 18.

Figure 20:
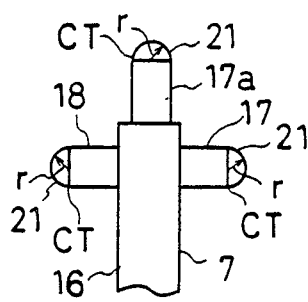

In FIG. 20, pins 17 and 18 are formed in the opposite directions to each other laterally with respect to the longitudinal direction of the rod body 16, also a pin 17a is formed in perpendicular to the end surface of the rod body 16, and touch portions 21 are provided at the tip ends of the respective pins 17, 18 and 17a.

Figure 21:
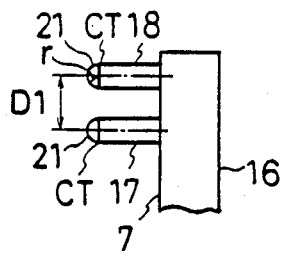

In FIG. 21, two pins 17 and 18 are provided as spaced by a distance $D_1$ in parallel to each other laterally with respect to the longitudinal direction of the rod body 16, and touch portions 21 are formed at their tip ends.

Figure 22:
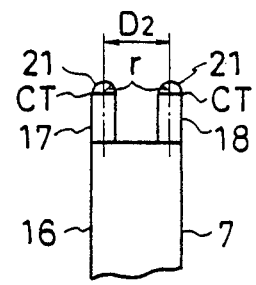

In FIG. 22, two pins 17 and 18 are provided as spaced by a distance $D_2$ on the end surface of the rod body 16 in perpendicular to the end surface, and touch portions 21 are formed at their tip ends. The distances $D_1$ and $D_2$ have an magnitude of an integral multiple of the pitch P, that is, [pitch P]$\times$n.

Figure 23:
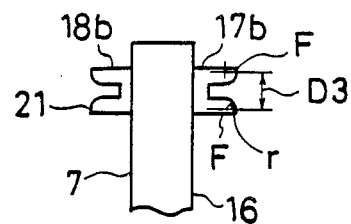
Figure 24:
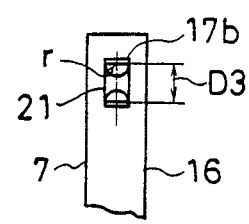

In FIGS. 23 and 24, pins 17b and 18b having a recessed shape are provided in the opposite directions to each other laterally with respect to the longitudinal direction of the rod body 16, the tip ends of the inside of the recessed portion are formed in a spherical shape having a radius r, and a distance $D_3$ between the centers F of the spherical portions is chosen to be equal to $\frac{1}{2}$ pitches.

Figure 25:
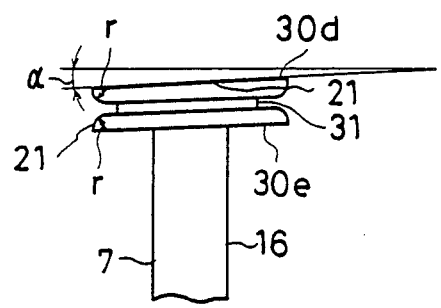

In FIG. 25, circular plates 30d and 30e connected to each other via a connecting member 31, are provided on the end surface of the rod body 16 with an inclination of the lead angle $\alpha$. The insides of the dge portions of the circular plates 30d and 30e are spherical surfaces having a radius r.

Figure 26:
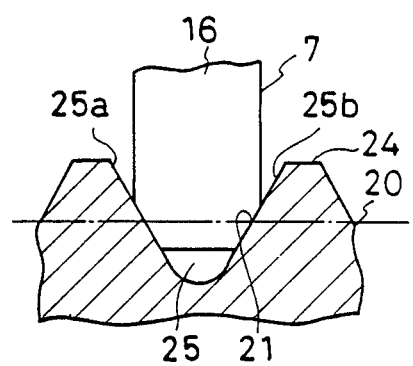

Next, description will be made on a thread touch sensor 7 of the type that a touch portion 21 comes into line contact with an effective diameter portion 20 as shown in FIG. 26 (pattern 2).

Figure 27:
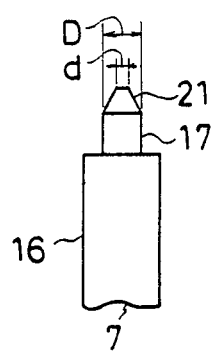
Figure 28:
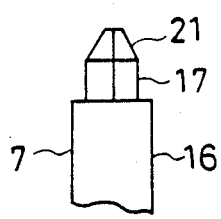
Figure 29:
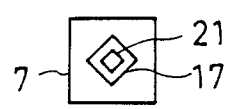
Figure 30:
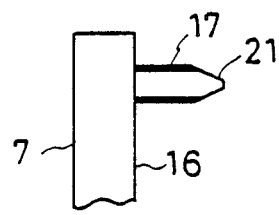
Figure 31:
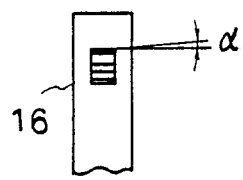

In FIGS. 27 to 31, a single pin 17 is provided on the rod body 16, and the touch portion 21 is formed at its tip end. In FIGS. 27 to 29, the pin 17 is provided on the end surface of the rod body 16 in perpendicular thereto. The pin 17 in FIG. 27 has a cylindrical shape, and its touch portion 21 is a frusto-conical body. In FIGS. 28 and 29, the pin 17 is a square post, and its touch portion 21 is a square frustum. In FIGS. 30 and 31, a single pin 17 is provided laterally with respect to the longitudinal direction of the rod body 16, and at its tip end is formed a touch portion with an inclination of the lead angle $\alpha$.

Figure 32:
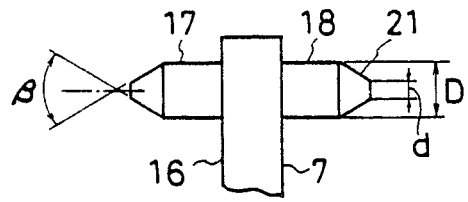
Figure 33:
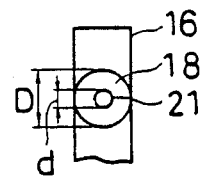
Figure 34:
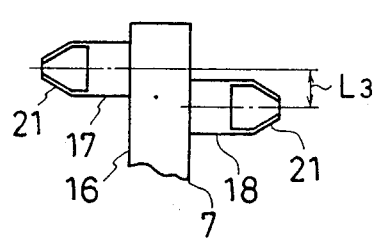
Figure 35:
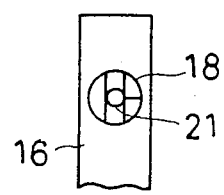

FIGS. 32 to 37 illustrate touch sensors 7 each having a plurality of touch portions 21. In FIGS. 32 and 33, pins 17 and 18 directed in the opposite directions to each other are formed laterally with respect to the longitudinal direction of the rod body 16. In these figures, reference character $\beta$ designates the angle at which two opposed generating lines of a conical surface of a touch portion 21 intersect with each other, reference character $\alpha$ designates a diameter of a tip end of the touch portion 21, and reference character D designates a diameter of the pins 17 and 18. In FIGS. 34 and 35 also, pins 17 and 18 are provided laterally with respect to the longitudinal direction of the rod body 16 as directed in the opposite directions to each other. However, in this case, the pin 18 is displaced with respect to the pin 17 by a distance $L_3$=[measurement angle in the direction of the lead angle about the axis of the screw thread]$\times$-[pitch P/360°].

Figure 36:
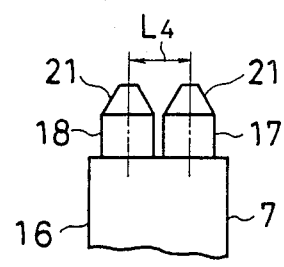
Figure 37:
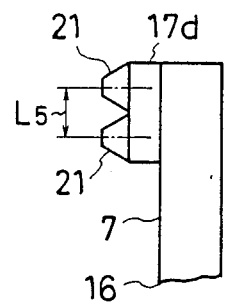

In FIG. 36, two pins 17 and 18 are provided on the end surface of the rod body 16 in perpendicular thereto as separated by a distance $L_4$ from each other, and touch portions 21 are formed at their tip ends. In FIG. 37, a pin 17d is provided laterally with respect to the longitudinal direction of the rod body 16, and two touch portions 21 are formed at the tip end of the pin 17d as separated by a distance $L_5$ from each other. These distances $L_4$ and $L_5$ are chosen to be equal to n times the pitch P.

For instance, with regard to the pattern 2, a representative example of the relations of the diameter D of the pin and the tip end diameter d of the frusto-conical portion to the pitch P in the case of the JIS 60° meter scale screw thread, is as follows:

| pitch P | diameter D (mm) | tip end diameter $\underline{d}$ (mm) |
| --- | --- | --- |
| 0.2 | $D \leqq 0.100$ | $0.025 < d \leqq 0.100$ |
| 0.25 | $D \geqq 0.125$ | $0.032 < d \leqq 0.125$ |
| 0.5 | $D \geqq 0.250$ | $0.063 < d \leqq 0.250$ |

-continued

| pitch P | diameter D (mm) | tip end diameter d (mm) |
|---|---|---|
| 1.0 | D ≧ 0.500 | 0.125 < d ≦ 0.500 |
| 1.5 | D ≧ 0.750 | 0.188 < d ≦ 0.750 |
| 1.75 | D ≧ 0.875 | 0.219 < d ≦ 0.875 |
| 2.0 | D ≧ 1.000 | 0.250 < d ≦ 1.000 |
| 2.5 | D ≧ 1.250 | 0.313 < d ≦ 1.250 |
| 3.0 | D ≧ 1.500 | 0.375 < d ≦ 1.500 |

Figure 38:
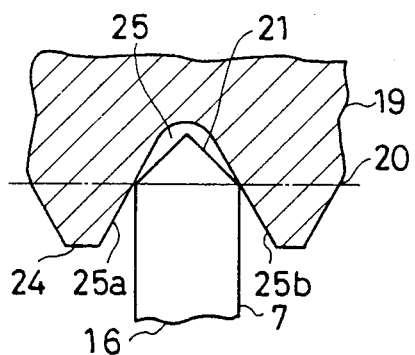

Furthermore, description will be made on a thread touch sensor 7 whose touch portion 21 comes into contact with an effective diameter portion 20 of a screw thread at its angular edge portion as shown in FIG. 38 (pattern 3). In FIGS. 39 and 40, a single pin 17 is provided on the end surface of the rod body 16 in perpendicular thereto, and its tip edge portion is used as a touch portion 21. In FIG. 41, a circular plate 30 is provided on the end surface of the rod body 16 as inclined by the lead angle $\alpha$, and its edge portion forms an angular touch portion. Reference character D designates a thickness of the circular plate 30. In FIGS. 42 to 45, pins 17 and 18 directed in the opposite directions to each other are provided laterally with respect to the longitudinal direction of the rod body 16, and the tip end edge portions of the pins 17 and 18 are used as touch portions 21. In FIGS. 42 and 43, cylindrical pins 17 and 18 having a diameter D are disposed in a symmetric manner. In FIGS. 44 and 45, pins 17 and 18 having a rectangular cross-section and a thickness D are provided as inclined by the lead angle $\alpha$.

Figure 46:
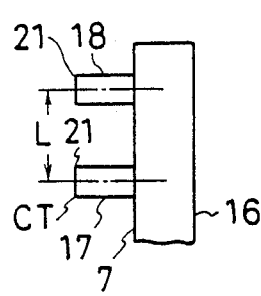
Figure 47:
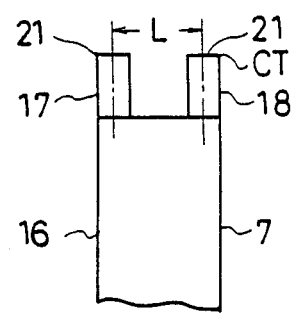

In FIG. 46, pins 17 and 18 directed laterally with respect to the longitudinal direction of the rod body 16, are disposed as separated by a distance L, and in FIG. 47 two pins 17 and 18 are disposed on the end surface of the rod body 16 in perpendicular thereto as spaced by a distance L from each other. In either embodiment, the tip end edge portions of the pins 17 and 18 are used as touch portions 21, and the distance L is selected to be equal to n times the pitch P.

Figure 48:
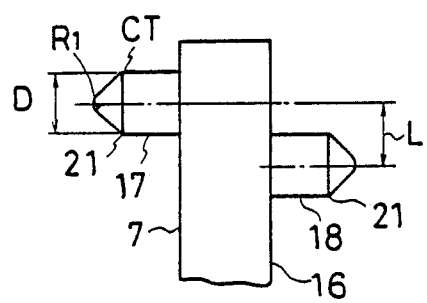
Figure 49:
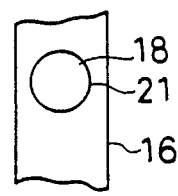

In FIGS. 48 and 49, cylindrical pins 17 and 18 directed in the opposite directions to each other are provided laterally with respect to the longitudinal direction of the rod body 16, and at the tip end portion of the pins 17 and 18 are formed cones having their tip end rounded with a radius $R_1$. The pins 17 and 18 are displaced from each other in the direction of the lead angle by a distance L =[measurement angle in the direction of the lead angle about the center axis of the screw thread]×[pitch/360°], and the points CT where the touch portion 21 touches the both surfaces of the thread groove are located at the tip end edge portion of the pin.

Figure 50:
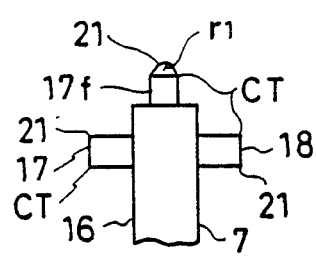
Figure 51:
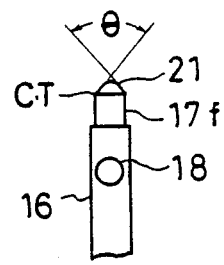

In FIGS. 50 and 51, there are provided pins 17 and 18 formed symmetrically on the opposite sides of the rod body 16 and another pin 17f formed on the end surface of the rod body 16, and at the tip end portion of the pin 17f is formed a touch portion 21 consisting of a cone having its tip end rounded with a radius $r_1$. The angle $\theta$ formed at the tip end of the conical surface of the touch portion 21 of the pin 17f is larger than the thread groove angle, and the spherical surface having the radius $r_1$ is tangential to this conical surface.

Figure 52:
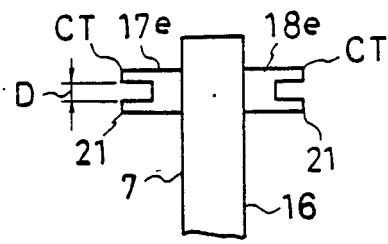
Figure 53:
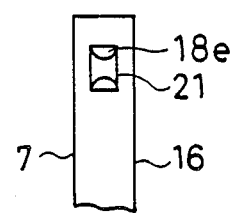

In FIGS. 52 and 53, pins 17e and 18e having a recessed shape are formed in the opposite directions to each other laterally with respect to the longitudinal direction of the rod body 16, and the distance between the opposed side portions of the recessed shape is selected to be D.

In FIG. 54, two circular plates 30g and 30h connected via a connecting member 31 are fixedly secured to the end surface of the rod body 16, and the distance between the circular plates 30g and 30h is selected to be D.

In the case of the above-described pattern 3, for instance, a representative example of the relation of the dimension D of the angular edge portions of the pins 17 and 18 to the pitch P for the JIS 60° meter scale screw thread, is as follows:

| pitch P | dimension D (mm) |
|---|---|
| 0.2 | 0.100 |
| 0.25 | 0.125 |
| 0.5 | 0.250 |
| 1.0 | 0.500 |
| 1.5 | 0.750 |
| 1.75 | 0.875 |
| 2.0 | 1.000 |
| 2.5 | 1.250 |
| 3.0 | 1.500 |

In addition, with regard to the touch sensor whose touch portion has a spherical surface, besides the embodiments illustrated in FIGS. 11 to 25, other modified embodiments could be employed. For instance, in a modified embodiment shown in FIG. 55, a diameter $2r_a$ of a joint portion between a spherical portion 7a having a radius r and a pin 17 radically diverging towards the rod body 16 is made smaller than the diameter 2r of the spherical portion 7a, and in another modified embodiment shown in FIG. 56, a diameter $2r_b$ of a joint portion 10b between a hemispherical portion 7b having a radius r and a pin 17 radially diverging towards the rod body 16 is made equal to the diameter 2r of the hemispherical portion 7b, and an inclination angle $\alpha a$ of the surface of the pin 17 is selected not greater than one-half of the thread groove angle.

While description has been made above in connection to various possible configurations of the touch sensor 7, besides the above-described configurations, a plurality of pins directed alternately in the opposite directions could be provided laterally with respect to the longitudinal direction of the rod body as spaced by ½ pitches in the longitudinal direction of the rod body, with the touch portions formed at the respective tip ends of the pins.

Since the present invention is characterized by the above-described structural features, it is possible that an effective diameter of a screw thread is measured during a threading operation and the threading is performed while automatically correcting an NC-lathe on the basis of the measured dimensions. Alternatively, measurement could be done after the threading and automatic correction could be performed during threading of the next work. Accordingly, the finished screw threads has dimensions falling within a desired dimension range, and hence, distribution of the dimensions is small and a high precision of the finished screw threads can be maintained. Moreover, since the threading error can be automatically corrected, enhancement of a working efficiency can be achieved.

What is claimed is:

1. For an NC-lathe for machining a thread groove in a screw, a method of determining the effective radius of the machined thread groove comprising the steps of:
   providing a set of coordinates wherein an X-coordinate direction extends along an axis parallel the longitudinal axis of said screw and a y-coordinate direction extends along an axis perpendicular to said x-coordinate direction;

providing a thread touch sensor;

providing means for indexing the thread touch sensor to a plurality of positions;

indexing said thread touch sensor into contact with an arbitrary point on said screw;

determining the coordinate values (Xa, Ya) of said arbitrary point;

indexing said thread touch sensor ½ pitch length in the X-coordinate direction away from said arbitrary point, while indexing said thread touch sensor in the Y-coordinate direction away from said screw to insure said screw does not interfere with said indexing of the thread touch sensor in the X-coordinate direction;

indexing said thread touch sensor in the Y-coordinate direction towards the screw until the thread touch sensor contacts the screw thread at an intermemiate point (Xi, Yi);

determining the coordinate values of the intermediate point (Xi, Yi);

determining which of the arbitrary point or the intermediate point is a start point, said start point being whichever of the arbitrary point or the intermediate point has a smaller Y-coordinate value indicating which of said points is located in the thread groove;

indexing said thread touch sensor to said start point;

incrementally indexing said thread touch sensor in the positive and negative X-coordinate direction from said start point and subsequently moving said thread touch sensor into contact with said screw following each of said incremental indexes, determining which of said alternate incremental points has the smaller Y-coordinate value and moving the thread touch sensor to the incremental point having the smaller Y-coordinate value, and repeating the step until the opposite points yield the same Y-coordinate value, thus indicating the thread touch sensor is centered in the thread groove, said point being a center point; and determining the Y-coordinate value of the center point, said Y-coordinate value representing the radius of the screw thread.

2. The method of claim 1 wherein said second to last step is repeated at progressively smaller increments.

3. For an NC-lathe for machining a thread groove at a constant pitch length (P) on a tapered screw at a predetermined taper angle ($\theta$), said NC-lathe having a thread touch sensor and means for indexing the thread touch sensor to a plurality of positions, a method of determining the actual taper angle threaded in the tapered screw comprising the steps of:

determining the coordinate values of a first position in centered contact with the thread groove;

determining the radius of said thread groove at said first position;

determining the coordinate values of a second position in centered contact with the thread groove, said second position located an integral number (n) of thread pitches from said first position;

determining the radius of said thread groove at said second position;

determining the difference (R) between said first radius and said second radius; and calculating said taper angle (?) pursuant to the determined values of the radius difference (R), the pitch length (P) and the number of thread pitches (n) between said first position and said second position.

4. The method of claim 1 wherein said first position is determined by the steps of:

providing a set of coordinates wherein an X-coordinate direction extends along an axis parallel the longitudinal axis of said screw and a y-coordinate direction extends along an axis perpendicular to said x-coordinate direction;

indexing said thread touch sensor into contact with an arbitrary point on said screw;

determining the coordinate values (Xa, Ya) of said arbitrary point;

indexing said thread touch sensor ½ pitch in the X-coordinate direction away from said abritrary point, while indexing said thread touch sensor in the Y-coordinate direction away from said screw to insure said screw does not interfere with said movement of the thread touch sensor in the X-coordinate direction;

indexing said thread touch sensor in the Y-coordinate direction until the thread touch sensor contacts the screw thread at an intermediate point (Xi, Yi);

determining the coordinate values of the intermediate point (Xi, Yi);

determining which of the arbitrary point or the intermediate point is a start point, said start point being the arbitrary point or the intermediate point having a smaller Y-coordinate value indicating which of said points is located in the thread groove;

indexing said thread touch sensor to said determined start point; and incrementally indexing said thread touch sensor in the positive and negative X-ccordinate direction from said start point, determining which of said incremental points has the smaller Y-coordinate value and moving the thread touch sensor to the incremental point having the smaller Y-coordinate value, and repeating this step umtil the the alternate points yield the same Y-coordinate value, thus indicating the thread touch sensor is centered in the thread groove, said point being the first point.

5. The method of claim 1 wherein the last step of incrementally indexing the thread touch sensor is repeated at progressively smaller increments.

6. For an NC-lathe for machining a thread groove in a screw, a method of determining the effective diameter of the machined thread groove comprising the steps of:

providing a set of coordinates wherein an X-coordinates direction extends along an axis parallel to the longitudinal axis of said screw and a y-coordinate direction extends along an axis perpendicular to said x-coordinate direction;

providing a thread touch sensor;

providing means for indexing the thread touch sensor to a plurality of predetermined positions;

indexing said thread touch sensor into contact with an arbitrary point on said screw;

determining the coordinate values (Xa,Ya) of said arbitrary point;

indexing said thread touch sensor ½ pitch in the X-coordinate direction away from said arbitrary point, while indexing said thread touch sensor in the Y-coordinate direction away from said screw to insure said screw does not interfere with said movement of the thread touch sensor in the X-coordinate direction;

indexing said thread touch sensor in the Y-coordinate direction until the thread touch sensor contacts the screw thread at an intermediate point (Xi, Yi);

determining the coordinate values of the intermediate points (Xi, Yi);

determining which of the arbitrary point or the intermediate point is a start point, said start point being the arbitrary point or the intermediate point having a smaller Y-coordinate valaue indicating which of said points is located in the thread groove;

indexing said thread touch sensor to said determined start point;

incrementally indexing said thread touch sensor in the positive and negative X-coordinate direction from said start points, determining which of said incremental points has the smaller Y-coordinate value and moving the thread touch sensor to the incremental point having the smaller Y-coordinate value, and repeating this step until the alternate points yield the same Y-coordinate value, thus indicating the thread touch sensor is centered in the thread groove, said point being a center point;

determining the Y-coordinate value of the center point;

rotating said thread touch sensor 180 degrees about said screw while indexing said thread touch sensor in the X-direction by an amount equal to ½ of the pitch length;

advancing the thread touch sensor in the Y-coordinate direction toward the screw until said thread touch sensor contact said screw thread at a rotated point, said rotated point being in centered contact with said screw thread;

determining the Y-coordinate value of said rotated point; and summing said Y-coordinate value of said first point with said Y-coordinate value of said rotated point, said sum representing the effective diameter of the screw.

7. In an NC-lathe utilizing a cutting tool subject to wear, said NC-lathe for machining a screw thread and having a thread touch sensor and means for indexing said thread touch sensor to a plurality of positions, a control circuit for maintaining the machining of said screw thread at a desired radius as said tool wears, the control circuit comprising:

means for indexing said thread touch sensor into contact with an arbitrary point on said screw;

means for determining the coordinate values (Xa, Ya) of said arbitrary point;

means for indexing said thread touch sensor ½ pitch length in an X-coordinate direction away from said arbitrary point, while indexing said thread touch sensor in a Y-coordinate direction away from said screw to insure said screw does not interfere with said indexing of the thread touch sensor in the X-coordinate direction wherein said x-coordinate direction extends along an axis parallel to the longitudinal axis of said screw and said y-coordinate direction extends along an axis perpendicular to said x-coordinate direction;

means for indexing said thread touch sensor in the Y-coordinate direction towards the screw until the thread touch sensor contact the screw thread at an intermediate point (Xi, Yi);

means for determining the coordinate values of the intermediate point (Xi, Yi);

means for determining which of the arbitrary point or the intermediate point is a start point, said start point being whichever of the arbitrary point or the intermediate point has a smaller Y-coordinate value indicating which of said points is located in the thread groove;

means for indexing said thread touch sensor to said determined start point;

means for incrementally indexing said thread touch sensor in the positive and negative X-coordinate direction from said start point and, subsequent to each incremental move, moving said thread touch sensor into contact with said screw following each of said incremental indexes, determining which of said incremental points has the smaller Y-coordinate value and moving the thread touch sensor to the incremental point having the smaller Y-coordinate value, and repeating this step until the incremental points yield the same Y-coordinate vaslue, thus indicating the thread touch sensor is centered in the thread groove, said point being a center point;

means for determining the Y-coordinate value of the center point, said Y-coordinate vaslue representing the radius of the screw thread;

means for comparing said desired radius to said actual radius; and means for correcting said position of said tool in response to said comparison.

8. In an NC-lathe utilizing a cutting tool subject to wear, said NC-lathe for machining a tapered screw at a desired taper angle ($\theta$d) and having a thread touch sensor and means for indexing said thread touch sensor to a plurality of positions, a control circuit for maintaining the machine of said tapered screw at the desired taper angle ($\theta$a) as said cutting tool wears, the control circuit comprising:

means for determining the coordinate values of a fIrst position in centered contact with the thread groove;

means for determining the radius of said thread groove at said first position;

means for determining the coordinate values of a second position in centered contact with the thread groove, said second position located an integral (n) number of thread pitches from said first position;

means for determining the radius of said thread groove at said second position;

means for determining the difference (R) between said first radius and said second radius;

means for determining an actual taper angle ($\theta$a) pursuant to the determined value of the radius difference (R), the pitch length (P) and the number of thread pitches (n) between said first position and said second position (X);

means for comparing said actual taper angle ($\theta$a) to said desired taper angle ($\theta$d); and means for correcting said position of said cutting tool in response to said comparison.

9. The control circuit of claim 1 wherein said means for determining said first position comprises:

means for indexing said thread touch sensor into contact with an arbitrary point on said screw;

means for determining the coordinate values (Xa, Ya) of said arbitrary point;

means for indexing said thread touch sensor ½ pitch in an X-coordinate direction away from said arbitrary point, while indexing said thread touch sensor in a Y-coordinate direction away from said screw to insure said screw does not interfere with said movement of the thread touch sensor in the X-corrdinate direction wherein said x-coordinate direction extends along an axis parallel to the longitudinal axis of said screw and said y-coordinate direction extends along an axis perpendicular to said x-coordinate direction;

means for indexing said thread touch sensor in the Y-coordinate direction until the thread touch sensor contacts the screw thread at an intermediate point (Xi, Yi);

means for determining the coordinate values of the intermediate point (Xi, Yi);

means for determining which of the arbitrary point or the intermediate point is a start point, said start point being the arbitrary point or the intermediate point having a smaller Y-coordinate value indicating which of said points is located in the thread groove;

means for indexing said thread touch sensor to said start point; and means for incrementally indexing said thread touch sensor in the positive and negative X-coordinate directions from said start point, determining which of said incremental points has the smaller Y-coordinate value and moving the thread touch sensor to the incremental point having the smaller Y-coordinate value, and repeating this step until the the alternate points yield the same Y-coordinate value, thus indicating the thread touch sensor is center in the thread groove, said point being the first point.

10. For an NC-lathe utilizing a cutting tool subject to wear, said NC-lathe for machining a thread groove in a screw and including a thread touch sensor, means for indexing the thread touch sensor to a plurality of positions, a control cirucit for determining the effective radius of the machined thread groove comprising:

means for indexing said thread touch sensor into contact with an arbitrary point on said screw;

means for determining the coordinate values (Xa, Ya) of said arbitrary point;

means for indexing said thread touch sensor ½ pitch length in an X-coordinate direction away from said arbitrary point, while indexing said thread touch sensor in a Y-coordinate direction away from said screw to insure said screw does not interfere with said indexing of the thread touch sensor in the X-coordinate direction wherein said x-coordinate direction extends along an axis parallel to the longitudinal axis of said screw and said y-coordinate direction extends along an axis perpendicular to said x-coordinate direction;

means for indexing said thead touch sensor in the Y-coordinate direction towards the screw until the thread touch sensor contacts the screw thread at an intermediate point (Xi, Yi);

means for determining the coordinate value of the intermediate point (Xi, Yi);

means for determining which of the arbitrary point or the intermediate point is a start point, said start point being whichever of the arbitrary point or the intermediate point has a smaller Y-coordinate value indicating which of said points is located in the thread groove;

means for indexing said theead touch sensor to said determined start point;

means for incrementally indexing said thread touch sensor in alternately opposite X-coordinate directions from said start point and subsequently moving said thread touch sensor into contact with said screw following each of said alternate incremental indexes, determining which of said incremental points has the smaller Y-coordinate value and moving the thread touch sensor to the incremental point having the smaller Y-coordinate value, and repeating this step until the alternate points yield the same Y-coordinate value, thus indicating the thread touch sensor is centered in the thread groove, said point being a center point; and means for determining the Y-coordinate value of the center point, said Y-coordinate value representing the radius of the screw thread.

* * * * *